June 20, 1961 R. H. SCHAFER 2,989,729

KEYBOARD CHECKING APPARATUS

Filed Dec. 10, 1958 2 Sheets-Sheet 1

INVENTOR.
ROBERT H. SCHAFER.
BY
J P Santo
ATTORNEY.

June 20, 1961 R. H. SCHAFER 2,989,729

KEYBOARD CHECKING APPARATUS

Filed Dec. 10, 1958 2 Sheets-Sheet 2

INVENTOR.
ROBERT H. SCHAFER.
BY
J P Santo
ATTORNEY.

2,989,729

KEYBOARD CHECKING APPARATUS

Robert H. Schafer, Farmington, Mich., assignor to Burroughs Corporation, Detroit, Mich., a corporation of Michigan Filed Dec. 10, 1958, Ser. No. 779,478
23 Claims. (Cl. 340—147)

This invention relates to an electronic checking apparatus for determining a contact engaging or circuit completing condition of each of a plurality of electrical switches actuated from a keyboard through which information is entered into the data receiving section of a business machine, computer and like device.

In particular, the invention relates to a keyboard switch checking apparatus for ascertaining and signalling an erroneous keyboard entry due to contact bounce or chatter or contact failure, the occurrence of which prevents accurate transfer of information into the machine or computer.

The invention has for its object to provide an improved keyboard switch checking apparatus for devices of the above character.

A specific object is to provide a keyboard checking apparatus in which the keyboard switches are scanned in succession to determine a contact bounce or failure condition, the occurrence of one or more of which failures or erratic conditions during a scanning cycle causes the initiation of a subsequent scanning cycle.

Another object is to provide a keyboard checking apparatus in which the scanning of the switches is caused to be repeated from an unsuccessful preceding scanning cycle until the expiration of a predetermined number of scanning cycles or counts when an alarm or signal device is actuated to indicate the presence of an erroneous entry.

A related object is to provide a keyboard checking apparatus in which a utilization or transfer device instead of the alarm device is actuated to permit the operation of the machine or device to continue or to advance to another state of operation under the assurance of a correct keyboard entry in the event that a circuit completing or contact settled condition is attained from each of the keyboard actuated switches during a successful scanning cycle.

Another object is to provide an improved keyboard entry checking apparatus in which the keyboard actuated switches are scanned at least twice or over at least two scanning cycles before signalling a successful keyboard check.

The manner of accomplishment of the above and other objects together with the features and advantages attending the present invention will appear more fully from the following description and drawings in which.

Figures 1, 2, 3, 4:
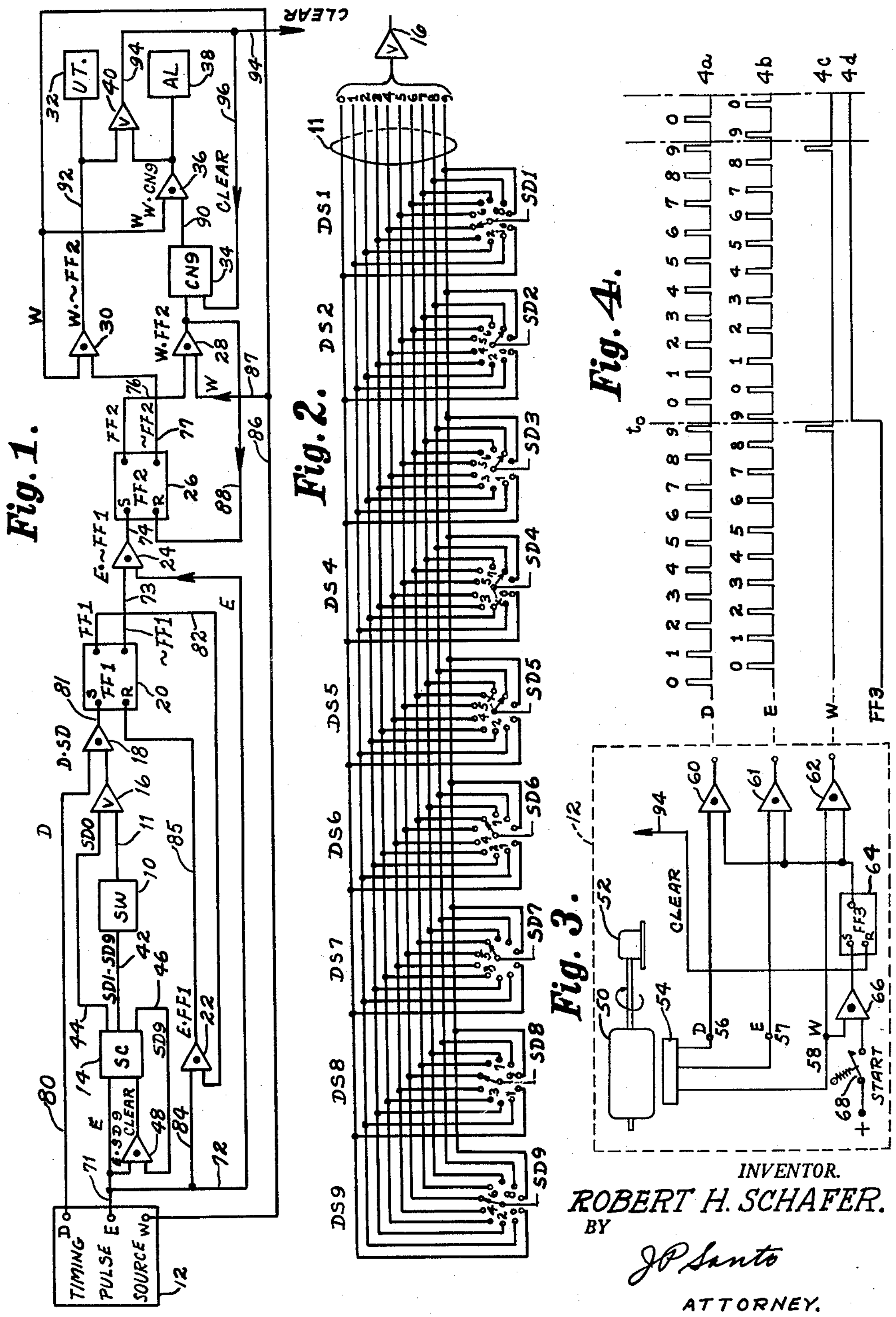
FIG. 1 is a single line block diagrammatic representation of a keyboard checking apparatus in accordance with the present invention.
FIG. 2 is a schematic electrical representation of a form of keyboard switch arrangement tested by the apparatus of the present invention.
FIG. 3 is a block diagrammatic representation of a simplified form of a timing pulse source for furnishing timing pulses to the keyboard checking circuit apparatus of FIG. 1.
FIG. 4 illustrates the wave forms developed by the apparatus of FIG. 3.

Referring to the drawings:

FIG. 1 illustrates the basic components employed in a form of keyboard checking apparatus in accordance with the invention for determining a contact bounce or circuit completing condition of each of a plurality of keyboard operated switches collectively constituting a keyboard switch assembly indicated generally at 10. The switches may be of the type employed in a full keyboard data entry device such as is employed in co-pending U.S. application, Serial No. 492,062, filed March 4, 1955, entitled Electronic Computer System in which each denominational order of the keyboard entry device has a decimal type storage switch associated with a corresponding data rack that is differentially positionable in accordance with the value of a depressed key of a column of keys assigned to that rack. Each decimal switch has an input terminal X selectively engageable with any one of a plurality of data output terminals 0–9 in accordance with the value of a key indexed in an amount column associated with the switch, and the respective output terminals of each of the decimal switches are bussed in parallel output data lines collectively represented at 11 in FIG. 2.

The keyboard checking apparatus comprises a timing pulse source 12 providing two displaced sets of digit timing pulses and a third set of word length timing pulses related to the timing pulses; a keyboard scanner 14 operated from one set of digit timing pulses and pulsing the inputs or common terminals of the several keyboard switches in succession upon application of successive digit timing pulses thereto from the timing pulse source 12; a buffer 16 coupled to the output data lines 11 connected to the corresponding output contacts or terminals of each of the several decimal switches; a logical "and" or coincidence gate 18 gating another set of digit timing pulses from the timing pulse source against the output of the buffer 16; a first bistable conducting device 20, which is set or transferred from its initial or resident state to its opposite state of conduction by a gated pulse from the output of gate 18 and is restored thereafter to its initial state by a pulse from a restoring coincidence gate 22 that gates an output of the first bistable device 20 with the aforementioned one set of timing digit pulses from the pulse source; a pulse transfer coincidence gate 24 for sensing a switch or scanning failure and gating the other output of the first bistable device 20 against the aforesaid one set of timing digit pulses from the pulse source; a second bistable conducting device 26 which is set from its initial or resident state to a transferred state of conduction by a pulse from the output of coincidence gate 24 and is restored to its initial state of conduction by a second restoring coincidence gate 28 that gates an output of the second bistable conducting device with a word length pulse of the third set of timing pulses; a utilization device 32 operated from another coincidence gate 30 gating the other output of the second bistable device against a word length pulse of the third set of timing pulses from the timing pulse source; a counter 34 coupled to and advanced one count each time the gate 28 becomes permissive; another coincidence gate 36 gating the counter output after the latter has been advanced or has attained a predetermined number of counts with a word length pulse to actuate a signal alarm device 38; and a buffer 40 connected between the inputs to the utilization device and alarm device.

The timing clock pulses developed by the timing pulse source 12 are indicated in FIGS. 4*a*, *b*, and *c*, bearing the designations D, E, and W corresponding to the notation of similar pulses developed by a magnetic drum and associated apparatus shown in FIG. 10 of the aforementioned patent application in which the D and E pulses are termed digit clock pulses and the W pulses are termed word length clock pulses. The various pulses are of uniform pulse width or duration, say approximately two microseconds, with the successive pulses of the individual sets shown in the present application, as being spaced apart by a time interval several times greater than their own width or duration, although in the aforementioned patent application, the successive pulses of the D and E pulse trains are displaced 130 microseconds apart. The E pulses correspond in number to and are displaced slightly in time space relation behind the corresponding D pulses. Each of the W or word length pulse coincides with each $(n+1)$ D pulse where $n$ corresponds to the number of switch units contained in the keyboard switch assembly of which there is one switch unit for each denominational order or column of keyboard amount keys, there being nine of such switch units in the illustrated embodiment of the present invention and 12 of such units in the keyboard apparatus of the aforementioned application.

The timing pulse source 12 for developing the various timing pulse trains of FIG. 4 may be similar to that employed in the aforementioned application and is shown in simplified form in FIG. 3 as comprising a magnetically coated drum or equivalent device 50, which is driven by a constant speed motor 52 and has a plurality of timing tracks thereon cooperating with a plurality of magnetic reading heads and associated circuitry shown collectively at 54 providing the D, E, and W pulses at terminal points 56, 57 and 58, respectively. For purpose of establishing a reference point in time or timing the start of the application of the timing pulses to the keyboard checking apparatus of FIG. 1, each of the D, E, and W conductor lines connected to the points 56, 57 and 58 includes a coincidence gate 60, 61 and 62, the other input to each of which gates is supplied from the set output of a normally reset bistable conducting device 64. One of the inputs to the bistable conducting device is supplied from the output of another coincidence gate 66 gating a W pulse from terminal point 58 with a starting signal or pulse supplied thereto over a starting control circuit which includes a start control switch 68 to set or transfer the flip-flop from its resident to its opposite conducting state and render the gates 60, 61 and 62 permissive under the joint control of the W pulse and the start signal or pulse. The bistable conducting device 64 may be a conventional flip-flop device having circuit parameters providing sufficient inherent delay with respect to the applied triggering pulse to delay its output or the effect of a change of state of its output until after the expiration of the triggering pulse, such, for example, as is provided in the flip-flop circuit of U.S. Patent 2,842,662. The effect of the delay in the output of the flip-flop 64 is illustrated in FIG. 4*d* in which the set output of the flip-flop transfers to its set level at reference time $t_0$ after the expiration of the first W pulse, $W_0$, which occurs after the closing of the start switch 68. Upon operation of the flip-flop, the gates 60, 61, and 62 become permissive, with the first pulse applied to the keyboard check apparatus being an $E_9$ pulse occurring slightly after $t_0$ time as illustrated.

Figure 5:
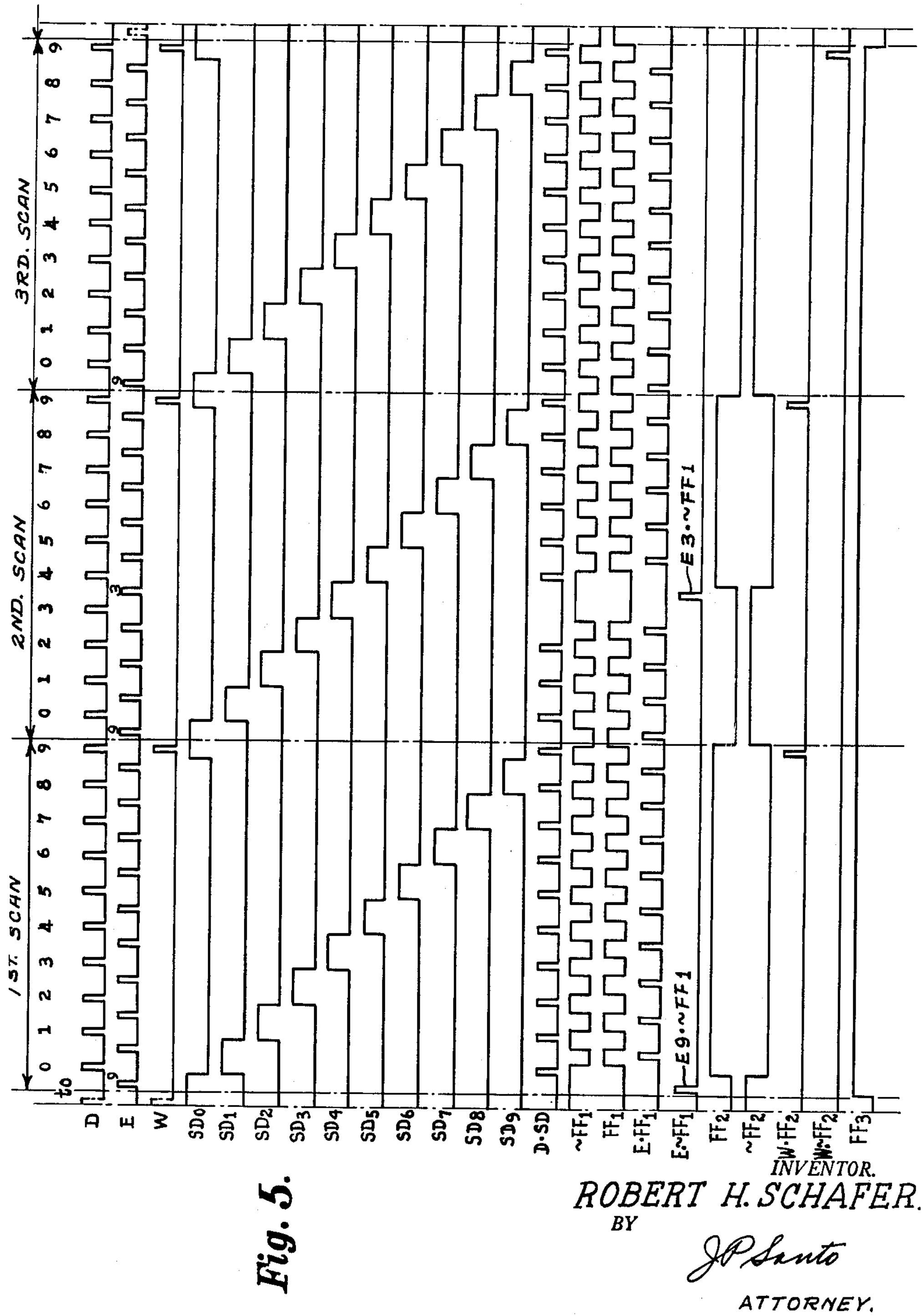
FIG. 5 illustrates the timing diagrams of various pulses occurring at various locations in the check circuit apparatus of FIG. 1.

The scanner device 14 may be of the electronic flip-flop variety comprising four binary flip-flop devices similar to flip-flop 64 and an output matrix decoder as illustrated in FIG. 34*b* of the aforementioned application with the scanner output lines SD1 to SD9 connected over individual lines collectively designated 42 to the input terminals of respectively corresponding keyboard decimal switches DS1 to DS9 as indicated in FIG. 2 and the SD0 scanner output line connected directly to the input of buffer 16 over line 44 as shown in FIG. 1, the output wave forms of the various sections of the scanner being shown in time space relationship in FIG. 5. For purposes of the present invention only the scanner output lines SD0 through SD9 of the scanner of the aforementioned application need be used, and the scanner may be reset or recycled by gating the output of section SD9 thereof on line 46 with a timing clock pulse in a coincidence gate 48 as indicated in FIG. 1.

Depending upon the speed and application of the system, the scanner conceivably could be of the electromechanical variety such as a conventional stepping switch in which the application of successive pulses to the operating coil thereof advances the switch arm, which is connected to one side of a source of potential to scan successive switch contact output terminals thereof.

The various buffer or logical "or" gates 16 and 40 and the logical "and" or coincidence gates 18, 22, 24, 28, 30, 36, 48, 60, 61, 62, and 66 may be of the conventional electronic type or diode resistor variety well known in the art.

The first and second bistable conducting devices 20 and 26 may be electronic flip-flop devices similar to flip-flop 64 with sufficient inherent or built-in delay to delay the effect of a change in the state of the flip-flop until after the expiration of the triggering pulses applied thereto, as in the flip-flop circuit illustrated in the aforementioned U.S. Patent No. 2,842,662.

The counter 34 may be a decade counter of the electronic variety comprising four binary coupled flip-flops to produce an output at the count of nine as illustrated in U.S. Patent No. 2,824,961 and is cleared with the operation of the utilization device 32 or the signal alarm device 36 by a clear signal supplied from the output of the buffer 40. The same clearing signal may also be applied to the reset input of the flip-flop 64 to interrupt the application of timing pulses from the timing pulse source 12 to the keyboard checking apparatus, as indicated.

The operation of the keyboard switch checking apparatus will be described with reference to the wave forms of FIG. 5 in which, at start time $t_0$, the bistable conducting devices 20 and 26, labelled FF1 and FF2, are shown in their normally reset condition with their "not" outputs labelled ∼FF1 and ∼FF2, respectively, shown at their high output or conducting level and in which the scanner 14 is shown providing an output from section SD0 thereof.

The scanner is advanced from the E digit clock pulses as illustrated in FIG. 1, the first of these pulses furnished from the timing pulse source in the first scanning cycle being an $E_9$ pulse which turns off scanner section SD0 and turns on section SD1 after the expiration of the scanning count pulse. The next E pulse, $E_0$, turns off SD1 and turns on scanner section SD2, which action continues until timing pulse $E_7$ turns off scanner section SD8 and turns on section SD9. The output of scanner section SD9 is then gated in coincidence gate 48 with the succeeding $E_8$ timing pulse to turn off scanner section SD9 and to restore or recycle the scanner to state SD0 thereof in preparation for a subsequent cycle of operation of the scanner through states SD0 through SD9 thereof.

The first digit timing pulse furnished from the timing pulse source 12 after time $t_0$ is the aforementioned $E_9$ pulse which is applied over line 71 to the scanner 14 and over branch line 72 to the coincidence gate 24 where it is gated against the initially high 'not" output, ∼FF1, of FF1 appearing on line 73, thereby rendering the gate permissive and transferring a pulse over line 74 to the set terminal of flip-flop FF2. Since flip-flop FF2 is initially in its reset condition, the triggering pulse applied thereto from gate 24 transfers FF2 to its opposite or set state of conduction after the expiration of the $E_9 \cdot FF1$ gate pulse, thus raising the potential level of FF2 output line 76 and lowering the level of the "not" or ∼FF2 output line 77.

The $E_9$ pulse applied to the input of scanner 14 operates the scanner to transfer from its SD0 state to its SD1 state after the expiration of the triggering or count pulse, as illustrated. With scanner output SD1 high, a circuit is completed, in accordance with the keyboard indexed setting of decimal switch DS1 and in the absence of a bounce or open switch condition, from the common input terminal of keyboard decimal switch DS1, which is connected to the SD1 output line, and through one of the output contacts of switch DS1 to a corresponding one of the data output lines connected to the input of buffer 16, the output of which is connected to the input of coincidence gate 18.

The next digit timing pulse furnished from the timing pulse source is a $D_0$ pulse which is applied to the input of coincidence gate 18 over line 80, thus rendering the gate permissive, since at $D_0$ time, one of the data output lines connected to decimal switch DS1 was rendered high by scanner output SD1 which output is still high at $D_0$ time. Therefore, a gated $D_0 \cdot SD1$ pulse is applied over line 81 to the set terminal of flip-flop FF1, which is in its initially reset condition and is caused to transfer to its set state of conduction in which the potential level of the FF1 output line 82 is raised and the potential level of the ~FF1 output line 73 is lowered after the expiration of the gated setting pulse applied thereto, as illustrated.

The next timing pulse furnished from the timing pulse source is an $E_0$ pulse which is applied over line 72 to one of the inputs of coincidence gate 24, the other input of which, viz. ~FF1 is low at this time so that the output $E_0 \cdot \sim FF1$ of the gate 24 is blocked or inhibited. The $E_0$ pulse is also applied over branch line 84 to one of the inputs of the coincidence gate 22, the other input of which is connected to the FF1 output line 82, which is high at this time and renders the gate 22 permissive to transfer a gated $E_0 \cdot FF1$ pulse over line 85 to reset FF1 after the expiration of the latter pulse, as illustrated. The same $E_0$ pulse is also applied to the scanner to turn off scanner section SD1 and to turn on section SD2 after the expiration of the $E_0$ pulse.

Scanner output SD2 then scans the condition of keyboard operated decimal switch DS2, the circuit completing condition of which is then subsequently checked by the following $D_1$ timing digit or clock pulse which renders the gate 18 permissive or inhibitive depending upon whether or not the scanning signal pulse is transmitted through the scanned decimal switch.

Since the flip-flop devices FF1 and FF2 were initially in their reset condition with their "not" outputs raised to conducting level, it was noted that the first digit timing pulse $E_9$ applied to the keyboard checking apparatus was gated in coincidence gate 24 with the "not" output, ~FF1, of flip-flop FF1, thereby rendering the gate permissive and setting flip-flop FF2. Thus, even though all of the decimal switches DS1 through DS9 were successfully scanned and found to be in circuit completing condition upon the completion of the first scanning cycle involving the successive application of scanner outputs SD1 through SD9 to the decimal switches, a pulse cannot be applied from the "not" output, ~FF2, of flip-flop FF2 to actuate the utilization device 32, since flip-flop FF2 has been transferred to its set state of conduction. Flip-flop FF2 is not reset until after the first word length or W pulse, which occurs at $D_9$ time, is applied over lines 86 and 87 to the coincidence gate 28 with the set output FF2 of this flip-flop, thereby to supply a gated $W \cdot FF2$ pulse over line 88 to reset the flip-flop, as indicated. The gated $W \cdot FF2$ pulse is also applied to the counter 34 in the signal alarm circuit to advance the counter one count. However, no output appears on output line 90 until the counter attains a count of nine so that the signal alarm device cannot be operated at this time. Since an operating signal has not been applied to the signal alarm device nor to the utilization device, no signal appears in the output of buffer 40, whereby flip-flop FF3 in the timing pulse source 12 of FIG. 3 remains in its set condition to permit the application of a second series of D, E, and W timing pulses from the timing pulse source 12 to the keyboard checking apparatus and to initiate a second cycle of scanning of the decimal switches commencing with another $E_9$ pulse.

Prior to the start of the second scanning cycle, the second flip-flop 26 or FF2 will have been restored to its resident or reset state by the W pulse of the first scanning cycle, as described above, while the first flip-flop 20 or FF1 will have been transferred to its opposite or set state by the $D_9$ pulse, which coincides with the aforesaid W pulse and is gated in coincidence gate 18 with scanner output SD0, the scanner having been restored to the latter state by the preceding $E_8$ timing pulse gated against scanner output SD9 in gate 48. Thus, the $E_9$ pulse at the beginning of the second scanning cycle is not gated through coincidence gate 24, since flip-flop FF1 has been set by the aforesaid gated $D_9 \cdot SD0$ pulse, whereby the "not" output line 73 of flip-flop FF1 will be low instead of high as was previously the case at the start of the first scanning cycle. Accordingly, flip-flop FF2 will not be set by the $E_9$ pulse of the second scanning cycle.

From the foregoing, it will be apparent that the full complement of keyboard switches is scanned over at least two complete scanning cycles before the signal utilization device can be actuated. This assures that the switches will remain in circuit completing condition after the first cycle and during the second scanning cycle and also permits the first scanning cycle to function as a contact "wetting" cycle during which the scanning pulses applied to the decimal switches "wet" the contacts thereof to remove any oxide or other coatings that may have been accumulated thereon during shut-down periods of the apparatus.

In the event of a switch failure during the second scanning cycle, flip-flop FF2 will again be set to lower its "not" output, ~FF2, and prevent transmission of a pulse therefrom to the utilization device, and a third scanning cycle will be initiated after flip-flop FF2 is reset by the word length pulse of the second scanning cycle. This action is illustrated in FIG. 5 in which decimal switch DS4 is assumed to be open at the time scanner output SD4 is applied thereto, so that the scanner output will not be transmitted through the decimal switch and the $D_3$ checking pulse will not be gated against the scanner output in coincidence gate 18. Thus, flip-flop FF1 will remain in the reset condition at $D_3$ checking time with its "not" output, ~FF1, at high potential level. Therefore, the $E_3$ timing pulse following the $D_3$ timing pulse will be gated in the scanner failure sensing, coincidence gate 24 with the "not" output, ~FF1, of flip-flop FF1 to transmit a gated $E_3 \cdot \sim FF1$ pulse to the set terminal of the now reset flip-flop FF2 and to set the latter flip-flop. Notwithstanding the fact that the remaining decimal switches DS5 through DS9 are subsequently found to be in circuit completing condition during the remainder of the scanning cycle, flip-flop FF2 cannot be reset until the expiration of the following word length pulse W, which appears near the end of the second scanning cycle and permits the initiation of a third scanning cycle as previously described.

In the event that all of the decimal switches should be closed and successfully scanned during the third scanning cycle, flip-flop FF2 will remain in its reset condition during the entire cycle, because flip-flop FF1 will have been successively and regularly set and reset by each $D \cdot SD$ pulse from gate 18 and following $E \cdot FF1$ pulse from gate 22. Accordingly, at any E pulse time of this scanning cycle, the "not" output, ~FF1, of flip-flop FF1 will be low and gate 24 will be inhibited, thereby preventing flip-flop FF2 from changing from its resident or reset state of conduction. The "not" output, ~FF2, of flip-flop FF2, therefore, will remain high as illustrated, so that at W pulse time of the third scanning cycle, the W pulse will be gated against the "not" output, ~FF2, of flip-flop FF2 in coincidence gate 30 to supply a gated $W \cdot \sim FF2$ pulse over line 92 to actuate the utilization device 32 and also transmit a clear pulse through buffer 40 over lines 94 and 96 to clear counter 34 and over line 94 reset flip-flop 64 or FF3 of the timing pulse source. Flip-flop FF3 resets shortly after the expiration of the W pulse of the third scanning cycle and renders the coincidence gates 60, 61, and 62 inhibitive to prevent the application of further timing pulses from the pulse source to the keyboard checking apparatus, the aforesaid flip-flop resetting shortly before the fourth scanning cycle could otherwise begin.

In the event of a scanning failure condition in the third scanning cycle, the counter 34 will be advanced to its third count or state and a fourth scanning cycle will be initiated as described above. The scanning will continue for each preceding unsuccessful scanning until the counter 34 has been advanced to its ninth count upon the expiration of the W pulse in the ninth scanning cycle, at which time the output line 90 thereof will be elevated to a high potential level. The signal alarm device 38, however, will not be actuated since the W pulse of the ninth scanning cycle has disappeared at the time the counter produces an output at the count of nine, so that a clear signal still will not be available from the buffer 40. Accordingly, a tenth scanning cycle will be initiated and if any one of the decimal switches is still in open circuit condition, the W pulse of the tenth scanning cycle will render the coincidence gate 36 permissive with the count of nine output of counter 34 and actuate the signal alarm device and supply a clear signal from buffer 40 to clear the counter and reset flip-flop FF3.

What is claimed is:

1. Means for determining a circuit completing condition of each of a plurality of actuated switches, each having at least one output selectively activated from an input, comprising, in combination: pulse generating means developing a series of uniformly spaced pulses; scanning means operated from said pulse generating means irrespective of the condition of each of said switches and connected to and pulsing the inputs of each of said switches in succession upon application of successive pulses to the scanning means from the pulse generating means; a bistable conducting device set to one state of conduction by a pulse transmitted through a scanned one of said switches and restored to its initial state of conduction between pulses from said pulse generating means; and pulse transferring means coupled to said bistable conducting device and transferring a pulse therethrough if the bistable conducting device remains in its initial state of conduction in the absence of a pulse transmitted through a scanned one of said switches.

2. Means for determining a circuit completing condition of each of a plurality of information-set switches, comprising, in combination: pulse generating means developing a series of uniformly spaced timing pulses; scanning means operated from said pulse generating means irrespective of the condition of each of said switches and connected to and pulsing each of said switches in succession upon application of successive pulses to the scanning means from the pulse generating means; a first bistable conducting device set to one state of conduction by a pulse transmitted through a scanned one of said switches and restored to its initial state of conduction between pulses from said pulse generating means; and means including a second bistable conducting device coupled to the first bistable conducting device and transferred from its inital to its opposite state of conduction if the first bistable conduction device remains in its initial state of conduction due to the absence of a pulse transmitted through a scanned one of the switches during the scanning of the switches.

3. Means for determining a circuit completing condition of each of a plurality of actuated switches, each having at least one output selectively activated from an input, comprising, in combination: pulse generating means developing a series of uniformly spaced timing pulses; scanning means operated from said pulse generating means irrespective of the condition of each of said switches and connected to and pulsing the inputs of each of said switches in succession upon application of successive pulses to the scanning means from the pulse generating means; a first bistable conducting device transferred from its initial to its opposite state of conduction by a pulse transmitted through a scanned one of said switches and restored to its initial state of conduction between pulses from said pulse generating means; means including a second bistable conducting device coupled to the first bistable conducting device and transferred from its initial to its opposite state of conduction if the first bistable conducting device remains in its initial state of conduction due to the absence of a pulse transmitted through a scanned one of the switches during the scanning of any one of said switches; and utilization means coupled to said second bistable conducting device and operated upon completion of the scanning of all of said switches if the second bistable conducting device has remained in its initial state of conduction.

4. Means for determining a circuit completing condition of each of a plurality of information-set switches, each having at least one output selectively activated from an input, comprising, in combination: pulse generating means developing a series of uniformly spaced timing pulses; scanning means operated from said pulse generating means irrespective of the condition of each of said switches and connected to and pulsing the inputs of each of said switches in succession upon application of successive pulses to the scanning means from the pulse generating means; a first bistable conducting device transferred from its initial to its opposite state of conduction by a pulse transmitted through a scanned one of said switches and restored to its initial state of conduction between pulses from said pulse generating means; means including a second bistable conducting device coupled to the first bistable conducting device and transferred from its initial to its opposite state of conduction if the first bistable conducting device remains in its initial state of conduction during the scanning of any one of said switches; and alarm means coupled to said second bistable conducting device and operated upon completion of the scanning of said switches if the second bistable device has changed its initial state of conduction during the scanning of the switches.

5. Means for determining a circuit completing condition of each of a plurality of actuated switches, each having at least one output selectively activated from an input, comprising, in combination: pulse generating means developing a series of uniformly spaced timing pulses; scanning means operated from said pulse generating means irrespective of the condition of each of said switches and connected to and pulsing the inputs of each of said switches in succession upon application of successive pulses to the scanning means from the pulse generating means; a first bistable conducting device transferred from its initial to its opposite state of conduction by a pulse transmitted through a scanned one of said switches and restored to its initial state of conduction between pulses from said pulse generating means; means including a second bistable conducting device coupled to the first bistable conducting device and transferred from its initial to its opposite state of conduction if the first bistable conducting device remains in its initial state of conduction during the scanning of any one of said switches; utilization means coupled to said second bistable conducting device and operated upon completion of the scanning of all of said switches if the second bistable conducting device has remained in its initial state of conduction; and alarm means coupled to said second bistable device and operated upon completion of the scanning of all of said switches if the second bistable conducting device has changed its initial state of conduction during the scanning of the switches.

6. Means for determining a circuit completing condition of each of a plurality of information-set switches, each having at least one output selectively activated from an input, comprising, in combination: pulse generating means developing a series of uniformly spaced timing pulses; scanning means operated from said pulse generating means irrespective of the condition of each of said switches and over repeated scanning cycles in each of which cycles the inputs of each of said switches are pulsed therefrom in succession upon application of successive pulses to the scanning means from the pulse generating means; a first bistable conducting device transferred from its initial to its opposite state of conduction by a pulse transmitted through a scanned one of said switches and restored to its initial state of conduction between pulses from said pulse generating means; means including a second bistable conducting device coupled to the first bistable conducting device and transferred from its initial to its opposite state of conduction if the first bistable conducting device remains in its initial state of conduction during the scanning of any one of said switches and restored in the latter case to its initial state of conduction upon completion of a cycle of scanning of all of said switches; counter means coupled to said second bistable conducting device and advanced one count upon completion of a cycle of scanning all of said switches if the second bistable device has changed its initial state of conduction during a scanning cycle; and alarm means coupled to said counter means and operated therefrom after the counter has been advanced a predetermined number of counts.

7. Means for determining a circuit completing condition of each of a plurality of actuated switches, each having at least one output selectively activated from an input, comprising, in combination: pulse generating means developing a series of uniformly spaced timing pulses; scanning means operated from said pulse generating means irrespective of the condition of each of said switches and over repeated scanning cycles in each of which the inputs of each of said switches are pulsed in succession upon application of successive pulses to the scanning means from the pulse generating means; a first bistable conducting device transferred from its initial to its opposite state of conduction by a pulse transmitted through a scanned one of said switches and restored to its initial state of conduction between pulses from said pulse generating means; means including a second bistable conducting device coupled to the first bistable conducting device and transferred from its initial to its opposite state of conduction if the first bistable conducting device remains in its initial state of conduction during the scanning of any one of said switches and restored in the latter case to its initial state of conduction upon completion of a cycle of scanning of all of said switches; utilization means coupled to said second bistable conducting device and operated upon completion of a switch scanning cycle if the second bistable device has remained in its initial state of conduction during the scanning of said switches; counter means coupled to said second bistable conducting device and advanced one count upon completion of a cycle of scanning of said switches if the second bistable device has changed its initial state of conduction during a scanning cycle; and alarm means coupled to said counter means and operated therefrom after the counter has been advanced a predetermined number of counts.

8. Means for determining a circuit completing condition of each of a plurality of actuated switches, each having at least one output selectively activated from an input, comprising, in combination: pulse generating means developing a first series of uniformly spaced timing pulses and a second series of similarly spaced auxiliary timing pulses, each occurring intermediate an adjacent pair of pulses of the first series of pulses; scanning means operated irrespective of the condition of each of said switches by the pulses of said first series of pulses from said pulse generating means and pulsing the inputs of each of said switches in succession upon application of successive pulses thereto; gating means gating the scanned output of an actuated switch with a pulse of the second series of pulses from said pulse generating means; a bistable conducting device transferred from its initial to its opposite state of conduction by a pulse from said gating means and restored thereafter to its initial state of conduction after changing its initial state of conduction by a following pulse of the first series of pulses from said pulse generating means; and gating means gating the bistable conducting device with the aforesaid following pulse from the first series of pulses and transferring a gated pulse therefrom if the bistable conducting device remains in its initial state of conduction due to the absence of a scanning pulse transmitted through a scanned one of said actuated switches.

9. Means for determining a circuit completing condition of each of a plurality of information-set switches, each having at least one output selectively activated from an input, comprising, in combination: pulse generating means developing a first series of uniformly spaced timing pulses and a second series of similarly spaced auxiliary timing pulses each occurring intermediate an adjacent pair of pulses of the first series of pulses; scanning means operated irrespective of the condition of each of said switches from said first series of pulses from said pulse generating means and pulsing the inputs of each of said switches in succession upon application of successive pulses thereto; gating means gating the scanned output of a switch with a pulse of the second series of pulses from said pulse generating means; a first bistable conducting device transferred from its initial to its opposite state of conduction by a pulse transmitted through a scanned one of said switches and restored thereafter to its initial state of conduction by a following pulse of the first series of pulses from said pulse generating means; gating means gating said first bistable conducting device with the aforesaid following pulse from the other series of pulses and transferring a pulse therethrough if the bistable conducting device remains in its initial state of conduction due to the absence of a scanning pulse transmitted through a scanned one of said switches, and a second bistable conducting device transferred from its initial to its opposite state of conduction by a pulse from said last mentioned gating means and restored from its transferred to its initial state of conduction upon completion of the scanning of all of said switches.

10. Means for determining a circuit completing condition of each of a plurality of actuated switches, each having at least one output selectively activated from an input, comprising, in combination: pulse generating means developing a first series of uniformly spaced timing pulses and a second series of similarly spaced auxiliary timing pulses, each occurring intermediate an adjacent pair of pulses of the first series of pulses; scanning means operated irrespective of the condition of each of said switches from said first series of pulses from said pulse generating means and pulsing the inputs of each of said actuated switches in succession upon application of successive pulses thereto; first gating means gating the scanned output of an actuated switch with a pulse of the second series of pulses from said pulse generating means; a first bistable conducting device transferred from its initial to its opposite state of conduction by a pulse from said first gating means and restored thereafter to its initial state of conduction by a following pulse of the first series of pulses from said pulse generating means; second gating means gating said first bistable conducting device with the aforesaid following pulse from the first series of pulses and transferring a pulse therethrough if the bistable conducting device remains in its initial state of conduction due to the absence of a scanning pulse transmitted through a scanned one of said actuated switches; a second bistable conducting device transferred from its initial to its opposite state of conduction by a pulse from said second gating means and restored from its transferred to its initial state of conduction upon completion of the scanning of all said actuated switches; and utilization means coupled to said second bistable conducting device and operated upon completion of the scanning all of the actuated switches if the second bistable conducting device has remained in its initial state of conduction.

11. Means for determining a circuit completing condition of each of a plurality of actuated switches, each having at least one output selectively activated from an input, comprising, in combination: pulse generating means developing a first series of uniformly spaced timing pulses and a second series of similarly spaced auxiliary timing pulses, each occurring intermediate an adjacent pair of pulses of the first series of pulses; scanning means operated irrespective of the condition of each of said switches from said first series of pulses from said pulse generating means and pulsing the inputs of each of said actuated switches in succession upon application of successive pulses thereto; first gating means gating the scanned output of an actuated switch with a pulse of the second series of pulses from said pulse generating means; a first bistable conducting device transferred from its initial to its opposite state of conduction by a pulse from said first gating means and restored thereafter to its initial state of conduction by a following pulse of the first series of pulses from said pulse generating means; second gating means gating said first bistable conducting device with the aforesaid following pulse from the first series of pulses and transferring a pulse therethrough if the bistable conducting device remains in its initial state of conduction due to the absence of a scanning pulse transmitted through a scanned one of said actuated switches; a second bistable conducting device transferred from its initial to its opposite state of conduction by a pulse from said second gating means and restored from its transferred to its initial state of conduction upon completion of the scanning of all of said actuated switches; and signal alarm means coupled to said second bistable conducting device and operated upon completion of the scanning of all of the actuated switches if the second bistable conducting device has changed its initial state of conduction.

12. Means for determining a circuit completing condition of each of a plurality of actuated switches, each having at least one output selectively activated from an input, comprising, in combination; pulse generating means developing a first series of uniformly spaced timing pulses and a second series of similarly spaced auxiliary timing pulses, each occurring intermediate an adjacent pair of pulses of the first series of pulses; scanning means operated irrespective of the condition of each of said switches from said first series of pulses from said pulse generating means and pulsing the inputs of each of said actuated switches in succession upon application of successive pulses thereto; first gating means gating the scanned output of an actuated switch with a pulse of the second series of pulses from said pulse generating means; a first bistable conducting device transferred from its initial to its opposite state of conduction by a pulse from said first gating means and restored thereafter to its initial state of conduction by a following pulse of the first series of pulses from said pulse generating means; second gating means gating the first bistable conducting device with the aforesaid following pulse from the first series of pulses and transferring a pulse therethrough if the bistable conducting device remains in its initial state of conduction due to the absence of a scanning pulse transmitted through a scanned one of said actuated switches; a second bistable conducting device transferred from its initial to its opposite state of conduction by a pulse from said second gating means and restored from its transferred to its initial state of conduction upon completion of the scanning of all of said actuated switches; utilization means coupled to said second bistable conducting device and operated upon completion of the scanning of all of the actuated switches if the second bistable conducting device has remained in its initial state of conduction; and signal alarm means coupled to said second bistable conducting device and operated upon completion of the scanning of the switches if the second bistable conducting device has changed its initial state of conduction.

13. Means for determining a circuit completing condition of each of a plurality of information-set switches, each having at least one output selectively activated from an input, comprising, in combination; pulse generating means developing a first series of uniformly spaced timing pulses and a second series of uniformly spaced timing pulses each occurring intermediate an adjacent pair of pulses of the first series of pulses; scanning means operated irrespective of the condition of each of said switches from said first series of pulses from said pulse generating means and over repeated scanning cycles in each of which the inputs of each of said switches are pulsed in succession upon application of successive pulses to the scanning means from the pulse generating means; first gating means gating the scanned output of a switch with a pulse of the second series of pulses from said pulse generating means; a first bistable conducting device transferred from its initial to its opposite state of conduction by a pulse from said first gating means and restored thereafter to its initial state of conduction by a following pulse of the first series of pulses from said pulse generating means; second gating means gating said first bistable conducting device with the aforesaid following pulse from the first series of pulses and transferring a pulse therethrough if the bistable conducting device remains in its initial state of conduction due to the absence of a scanning pulse transmitted through a scanned one of said switches; a second bistable conducting device transferred from its initial to its opposite state of conduction by a pulse from said second gating means and restored from its transferred to its initial state of conducton upon completion of a cycle of scanning of all of said switches; counter means coupled to said second bistable conducting device and advanced one count upon completion of a cycle of scanning of all of said switches if the second bistable device has changed its initial state of conduction during a scanning cycle; and alarm means coupled to said counter means and operated therefrom after the counter has been advanced a predetermined number of counts.

14. Means for determining a circuit completing condition of each of a plurality of actuated switches, each having at least one output selectively activated from an input, comprising, in combination; pulse generating means developing a first series of uniformly spaced timing pulses and a second series of uniformly spaced timing pulses each occurring intermediate an adjacent pair of pulses of the first series of pulses; scanning means operated irrespective of the condition of each of said switches from said first series of pulses from said pulse generating means and over repeated scanning cycles in each of which the inputs of each of said actuated switches are pulsed in succession upon application of successive pulses to the scanning means from the pulse generating means; first gating means gating the scanned output of an actuated switch with a pulse of the second series of pulses from said pulse generating means; a first bistable conducting device transferred from its initially set to its opposite state of conduction by a pulse from said first gating means and restored thereafter to its initial state of conduction by the following pulse of the first series of pulses from said pulse generating means; second gating means gating said first bistable conducting device with the aforesaid following pulse from the first series of pulses and transferring a pulse therethrough if the bistable conducting device remains in its intial state of conduction due to the absence of a scanning pulse transmitted through a scanned one of said actuated switches; a second bistable conducting device transfered from its initial to its opposite state of conduction by a pulse from said second gating means and restored from its transferred to its initial state of conduction upon completion of a cycle of scanning of all of said actuated switches; utilization means coupled to said second bistable conducting device and operated upon completion of a switch scanning cycle if the second bistable conducting device has remained in its initial state of conduction during a cycle of scanning of all of said actuated switches; counter means coupled to said second bistable conducting device and advanced one count upon completion of a cycle of scanning of all of said actuated switches if the second bistable conducting device has changed its initial state of conduction during a scanning cycle; and alarm means coupled to said counter means and operated therefrom after the counter has been advanced a predetermined number of counts.

15. Means for determining a circuit completing condition of each of a plurality of information-set switches, each having at least one output selectively activated from an input, comprising, in combination: pulse generating means developing a first series of uniformly spaced timing pulses, a second series of uniformly spaced timing pulses each occurring intermediate an adjacent pair of pulses of the first series of pulses and a third series of pulses corresponding to and coinciding with each $(n+1)$ pulse of said second series of pulses where $n$ corresponds to the number of switches to be scanned; scanning means operated irrespective of the condition of each of said switches from the first series of pulses from said pulse generating means and over repeated scanning cycles in each of which the inputs of each of said switches are pulsed in succession upon application of successive pulses to the scanning means from the pulse generating means; first gating means gating the scanned output of a switch with a pulse of the second series of pulses from said pulse generating means; a first bistable conducting device transferred from its initial to its opposite state of conduction by a pulse from said first gating means and restored thereafter to its initial state of conduction by a following pulse of the first series of pulses from said pulse generating means; second gating means gating said first bistable conducting device with the aforesaid following pulse from the first series of pulses and transferring a pulse therethrough if the bistable conducting device remains in its initial state of conduction due to the absence of a scanning pulse transmitted through a scanned one of said switches; a second bistable conducting device transferred from its initial to its opposite state of conduction by a pulse from said second gating means and restored from its transferred to its initial state of conduction by a pulse from the third series of pulses from said pulse generating means upon completion of a cycle of scanning of all of said switches; counter means coupled to said second bistable conducting device and advanced one count in the aforesaid pulse of said third series of pulses upon completion of a cycle of scanning of all of said switches if the second bistable conducting device has changed its initial state of conduction during a scanning cycle; and alarm means coupled to said counter means and operated therefrom by a following one of the pulses of said third series of pulses after the counter has been advanced a predetermined number of counts.

16. Means for determining a circuit completing condition of each of a plurality of actuated switches, each having at least one output selectively activated from an input, comprising, in combination: pulse generating means developing a first series of uniformly spaced timing pulses, a second series of uniformly spaced timing pulses each occurring intermediate an adjacent pair of pulses of the first series of pulses, and a third series of pulses corresponding to and coinciding with each $(n+1)$ pulse of said second series of pulses where $n$ corresponds to the number of switches to be scanned; scanning means operated irrespective of the condition of each of said switches from said first series of pulses from said pulse generating means and over repeated scanning cycles in each of which the inputs of each of said actuated switches are pulsed in succession upon application of successive pulses to the scanning means from the pulse generating means; first gating means gating the scanned output of an actuated switch with a pulse of the second series of pulses from said pulse generating means; a first bistable conducting device transferred from its initial to its opposite state of conduction by a pulse from said first gating means and restored thereafter to its initial state of conduction by the following pulse of the first series of pulses from said pulse generating means; second gating means gating said first bistable conducting device with the aforesaid following pulse from the first series of pulses and transferring a pulse therethrough if the bistable conducting device remains in its initial state of conducton due to the absence of a scanning pulse transmitted through a scanned one of said actuated switches; a second bistable conducting device transfered from its initial to its opposite state of conduction by a pulse from said second gating means and restored from its transferred to its initial state of conduction by a pulse from the third series of pulses from said pulse generating means upon completion of a cycle of scanning of all of said actuated switches; utilization means coupled to said second bistable conducting device and operated by the aforesaid pulse of said third series of pulses upon completion of a switch scanning cycle if the second bistable conducting device has remained in its initial state of conduction during a cycle of scanning of all of said actuated switches; counter means coupled to said second bistable conducting device and advanced one count by the aforesaid pulse of said third series of pulses upon completion of a cycle of scanning of all of said actuated switches if the second bistable conducting device has changed its initial state of conduction during a scanning cycle; and alarm means coupled to said counter means and operated therefrom by a following one of the pulses of said third series of pulses after the counter has been advanced a predetermined number of counts.

17. Means for determining a circuit completing condition of each of a plurality of parallel set, actuated switches, each having at least one output selectively activated from an input, comprising, in combination: pulse generating means developing a series of uniformly spaced pulses; scanning means operated from said pulse generating means irrespective of the condition of each of said actuated switches and connected to and pulsing the inputs of each of said actuated switches in succession upon application of successive pulses to the scanning means from the pulse generating means; a bistable conducting device set to one state of conduction by a pulse transmitted through a scanned one of said actuated switches and restored to its initial state of conduction before the application of the next scanning pulse to the next actuated switch to be scanned; and pulse transferring means coupled to said bistable conducting device and transferring a pulse therethrough if the bistable conducting device remains in its intial state of conduction in the absence of a pulse transmitted through a scanned one of said actuated switches.

18. Means for determining a circuit completing condition of each of a plurality of parallel set, actuated switches, comprising, in combination: pulse generating means developing a series of uniformly spaced timing pulses; scanning means operated from said pulse generating means irrespective of the condition of each of said actuated switches and connected to and pulsing each of said actuated switches in succession upon application of successive pulses to the scanning means from the pulse generating means; a first bistable conducting device set to one state of conduction by a pulse transmitted through a scanned one of said actuated switches and restored to its initial state of conduction before the application of the next scanning pulse to the next actuated switch to be scanned; and means including a second bistable conducting device coupled to the first bistable conducting device and transferred from its initial to its opposite state of conduction if the first bistable conducting device remains in its initial state of conduction due to the absence of a pulse transmitted through a scanned one of the actuated switches during the scanning of the actuated switches.

19. Means for determining a circuit completing condition of each of a plurality of parallel set, actuated switches, each having at least one output selectively activated from an input, comprising, in combination: pulse generating means developing a series of uniformly spaced timing pulses; scanning means operated from said pulse generating means irrespective of the condition of each of said actuated switches and connected to and pulsing the inputs of each of said actuated switches in succession upon application of successive pulses to the scanning means from the pulse generating means; a first bistable conducting device transferred from its initial to its opposite state of conduction by a pulse transmitted through a scanned one of said switches and restored to its initial state of conduction before the application of the next scanning pulse to the next actuated switch to be scanned; means including a second bistable conducting device coupled to the first bistable conducting device and transferred from its initial to its opposite state of conduction if the first bistable conducting device remains in its initial state of conduction due to the absence of a pulse transmitted through a scanned one of the actuated switches during the scanning of any one of said actuated switches; and utilization means coupled to said second bistable conducting device and operated upon completion of the scanning of all of said actuated switches if the second bistable conducting device has remained in its initial state of conduction during the scanning of all of said actuated switches.

20. Means for determining a circuit completing condition of each of a plurality of parallel set, actuated switches, each having at least one output selectively activated from an input, comprising, in combination: pulse generating means developing a series of uniformly spaced timing pulses; scanning means operated from said pulse generating means irrespective of the condition of each of said actuated switches and connected to and pulsing the inputs of each of said actuated switches in succession upon application of successive pulses to the scanning means from the pulse generating means; a first bistable conducting device transferred from its initial to its opposite state of conduction by a pulse transmitted through a scanned one of said actuated switches and restored to its initial state of conduction before the application of the next scanning pulse to the next actuated switch to be scanned; means including a second bistable conducting device coupled to the first bistable conducting device and transferred from its initial to its opposite state of conduction if the first bistable conducting device remains in its initial state of conduction during the scanning of any one of said actuated switches; and alarm means coupled to said second bistable conducting device and operated upon completion of the scanning of said actuated switches if the second bistable device has changed its initial state of conduction during the scanning of the actuated switches.

21. Means for determining a circuit completing condition of each of a plurality of parallel set, actuated switches, each having at least one output selectively activated from an input, comprising, in combination; pulse generating means developing a series of uniformly spaced timing pulses; scanning means operated from said pulse generating means irrespective of the condition of each of said actuated switches and connected to and pulsing the inputs of each of said actuated switches in succession upon application of successive pulses to the scanning means from the pulse generating means; a first bistable conducting device transferred from its initial to its opposite state of conduction by a pulse transmitted through a scanned one of said actuated switches and restored to its initial state of conduction before the application of the next scanning pulse to the next actuated switch to be scanned; means including a second bistable conducting device coupled to the first bistable conducting device and transferred from its initial to its opposite state of conduction if the first bistable conducting device remains in its initial state of conduction during the scanning of any one of said actuated switches; utilization means coupled to said second bistable conducting device and operated upon completion of the scanning of all of said actuated switches if the second bistable conducting device has remained in its initial state of conduction; and alarm means coupled to said second bistable device and operated upon completion of the scanning of all of said actuated switches if the second bistable conducting device has changed its initial state of conduction during the scanning of the actuated switches.

22. Means for determining a circuit completing condition of each of a plurality of parallel set, actuated switches, each having at least one output selectively activated from an input, comprising, in combination: pulse generating means developing a series of uniformly spaced timing pulses; scanning means operated from said pulse generating means irrespective of the condition of each of said actuated switches and over repeated scanning cycles in each of which cycles the inputs of each of said actuated switches are pulsed therefrom in succession upon application of successive pulses to the scanning means from the pulse generating means; a first bistable conducting device transferred from its initial to its opposite state of conduction by a pulse transmitted through a scanned one of said actuated switches and restored to its initial state of conduction before the application of the next scanning pulse to the next actuated switch to be scanned, means including a second bistable conducting device coupled to the first bistable conducting device and transferred from its initial to its opposite state of conduction if the first bistable conducting device remains in its initial state of conducton during the scanning of any one of said actuated switches and restored in the latter case to its initial state of conduction upon completion of a cycle of scanning of all of said actuated switches; counter means coupled to said second bistable conducting device and advanced one count upon completion of a cycle of scanning of all of said actuated switches if the second bistable device has changed its initial state of conduction during a scanning cycle; and alarm means coupled to said counter means and operated therefrom after the counter has been advanced a predetermined number of counts.

23. Means for determining a circuit completing condition of each of a plurality of paralel set, actuated switches, each having at least one output selectively activated from an input, comprising, in combination: pulse generating means developing a series of uniformly spaced timing pulses; scanning means operated from said pulse generating means irrespective of the condition of each of said actuated switches and over repeated scanning cycles in each of which the inputs of each of said actuated switches are pulsed in succession upon application of successive pulses to the scanning means from the pulse generating means; a first bistable conducting device transferred from its initial to its opposite state of conduction by a pulse transmitted through a scanned one of said switches and restored to its initial state of conduction before the application of the next scanning pulse to the next switch to be scanned; means including a second bistable conducting device coupled to the first bistable conducting device and transferred from its initial to its opposite state of conduction if the first bistable conducting device remains in its initial state of conduction during the scanning of any one of said actuated switches and restored in the latter case to its initial state of conduction upon completion of a cycle of scanning of all of said actuated switches; utilization means coupled to said second bistable conducting device and operated upon completion of a switch scanning cycle if the second bistable device has remained in its initial state of conduction during the scanning of said actuated switches; counter means coupled to said second bistable conducting device and advanced one count upon completion of a cycle of scanning of said actuated switches if the second bistable device has changed its initial state of conduction during a scanning cycle of all of said actuated switches; and alarm means coupled to said counter means and operated therefrom after the counter has been advanced a predetermined number of counts.

References Cited in the file of this patent

UNITED STATES PATENTS

| | | |
|---|---|---|
| 2,700,755 | Burkhart | Jan. 25, 1955 |
| 2,716,230 | Oliwa | Aug. 23, 1955 |
| 2,719,959 | Hobbs | Oct. 4, 1955 |
| 2,735,091 | Burkhart | Feb. 14, 1956 |
| 2,869,076 | Evans et al. | Jan. 13, 1959 |
| 2,892,153 | Neill | June 23, 1959 |
| 2,892,888 | James et al. | June 30, 1959 |